Dec. 2, 1969  W. J. MACHOVINA  3,481,124
LAWN MOWER GUARD
Filed March 15, 1967  2 Sheets-Sheet 1

INVENTOR.
WILLIAM J. MACHOVINA
BY Watts, Hoffmann,
Fisher & Heinke
ATTORNEYS.

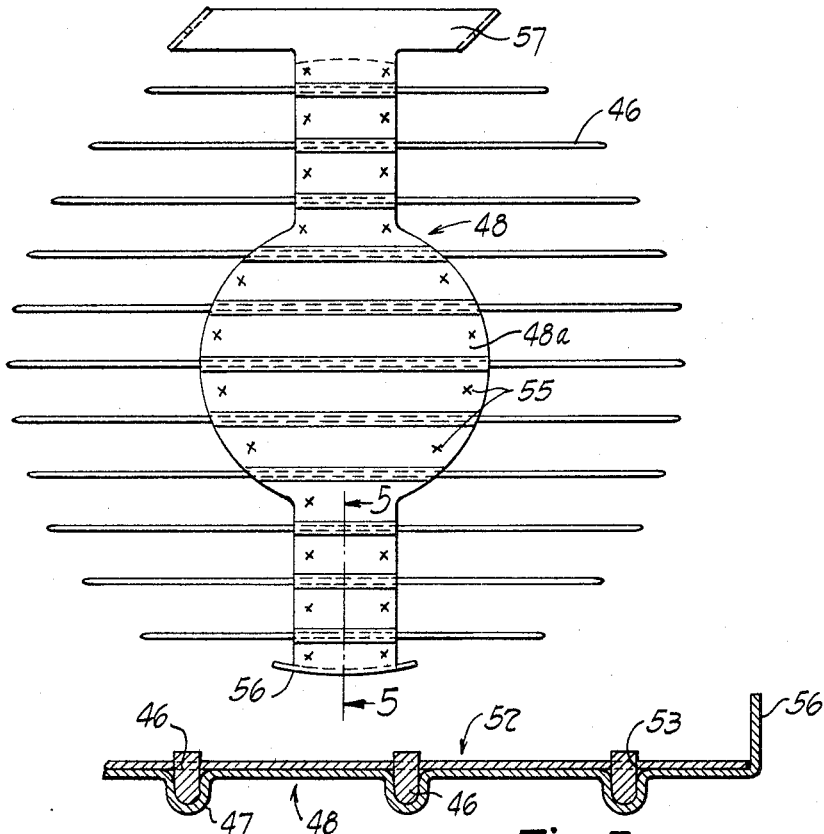
Fig. 4
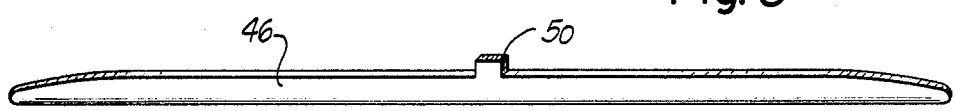
Fig. 5
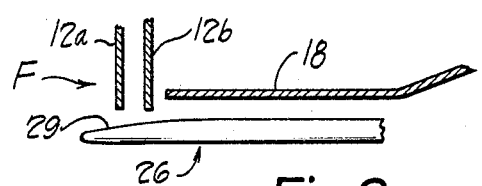
Fig. 6
Fig. 8
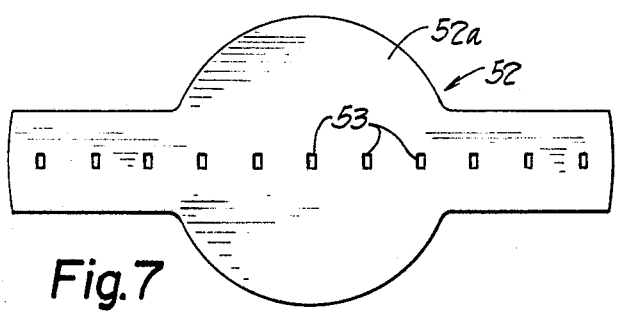
Fig. 7

United States Patent Office 3,481,124
Patented Dec. 2, 1969

3,481,124
LAWN MOWER GUARD
William J. Machovina, 105 Jacqueline Drive,
Berea, Ohio 44017
Filed Mar. 15, 1967, Ser. No. 623,331
Int. Cl. A01d 75/18, 55/18, 75/20
U.S. Cl. 56—255                       12 Claims

ABSTRACT OF THE DISCLOSURE

A guard for rotary type lawn mowers constructed of spaced cantilevered tines which extend in the direction of lawn mower movement and are located beneath the blade in spaced relation to the mower housing.

BACKGROUND OF THE INVENTION

This invention relates to lawn mower guards, especially to an improved guard for rotary type power lawn mowers.

Power operated rotary lawn mowers and the dangers and certain difficulties in their use are well known. Such lawn mowers have a relatively flat propeller-like blade that is rotated close to the ground at a very high speed to cut grass as the mower is pushed across a lawn. Grass that is cut is thrown through an opening in a housing over the blade. Usually the opening is in front or at one side of the housing.

The bottom of conventional rotary lawn mowers is completely open and sticks, stones and other foreign objects lying in the lawn are quite often struck with the rotating blade. In many cases the blade and/or the crankshaft of the motor will be damaged. In addition the foreign object may be hurled from the mower and strike and damage adjacent structures or injure nearby persons. Another danger is that the operator of the mower will himself be injured by the mower blade. This can happen, for example, if the operator slips and his foot passes beneath the mower housing.

One further difficulty encountered with the use of this type of lawn mower is that of scalping high portions of the lawn if the ground is uneven. For example, if one wheel of the mower drops into a depression, the plane of rotation of the blade is lowered and tilted, thereby causing the blade to cut the ground.

A major shortcoming of known guards for rotary mowers is that they have a detrimental effect upon the operation, particularly the cutting action, of the mower. For example, various attempts have been made to provide guards in the form of elongated bars or runners that extend from the front to the back of the mower housing beneath the blade. The opposite ends of these bars or runners were connected by cross members and/or were secured to the front and the back of the mower housing. It has been found that runners having their ends interconnected or attached to the housing cause the grass to flatten down as the mower is moved across the lawn. As a result, the grass is not evenly cut and ridges of uncut grass remain in each path of mowing. In addition, grass clippings, leaves, twigs and the like tend to collect in front of the guard, further flattening down the grass and increasing the effort necessary to push the mower across the lawn. One proposed solution to this problem has been to provide a guard that covers only the back portion of the mower beneath the blade. This protects the feet of the operator, but will not prevent the blade from striking or throwing foreign objects in the lawn.

The failure of the known lawn mower guards to provide the desired safety without having a detrimental effect upon the cutting action is best evidenced by the lack of consumer acceptance of such guard devices.

SUMMARY OF THE INVENTION

The present invention is a rotary lawn mower guard that provides complete protection beneath the path of the rotating blade without pushing the grass down in the direction of mower movement. Thus the guard provides the desired safety and avoids the detrimental effects of the known devices. In fact, it is believed that the new guard of this invention enhances the cutting action of the mower.

Briefly, the guard of this invention is constructed of straight, preferably pointed, tines which are connected intermediate their ends by a cross piece adapted to be secured to the mower housing. The spaces between the tines are unobstructed and are open from the ends of the tines to the intermediate cross-piece. The tines and cross-piece are located beneath the mower blade and the tines extend cantilevered from the cross piece in opposite directions toward the front and back of the mower beneath the entire path of blade movement. Normally, the mower housing includes one or more depending wall portions surrounding and enclosing the blade. The tines of the new guard are preferably spaced beneath the housing a sufficient distance to avoid contact with the housing, including any depending wall around the blade, at least across the front of the mower and preferably at other locations as well. This spacing and the cantilevered arrangement of the tines permits unobstructed entry of the grass to the rotating blade and the tines tend to comb the grass, setting it up for cutting.

Preferably, the tines are constructed for vertical rigidity while permitting lateral flexibility to absorb shock. To this end, they are shaped narrower than their height. The tines are long enough to extend beyond the housing wall that encloses the blade at the front of the mower by an amount sufficient to shield the blade effectively, and are spaced across the width of the housing to at least the extent of the blade path. The spaced tines are sufficiently thin to avoid flattening or obstructing the grass.

In use the guard of the present invention provides complete protection in the path of the rotary blade and prevents damage to the mower and scalping of the lown. The cantilevered tine arrangement of the new guard results in a combing action of the grass which is similar to the effect of running a comb through one's hair. This combing action of the tines as the mower is moved raises and straightens the grass so that it is uniformly cut by the rotating blade. As a result, the new guard structure prevents the occurrence of tracings or ridges of uncut grass in the mowed path. In some instances the cantilevered tines may noticeably improve the performance of a rotary mower, particularly when the grass is wet and difficult to cut because of the tendency of the grass to mat beneath the blade.

Accordingly, an object of this invention is to provide a new rotary lawn mower guard which operates in an unexpectedly improved manner and obtains all of the advantages described above.

Other objects and advantages and a fuller understanding of the invention will be had by reference to the following detailed description taken in conjunction with the accompanying drawings.

DESCRIPTION OF THE DRAWINGS

FIGURE 4 is a bottom plan view of another embodiment of a mower guard constructed in accordance with the present invention;

FIGURE 5 is a partial transverse cross-sectional view taken along the line 5—5 of FIGURE 4;

FIGURE 6 is a perspective view of a tine of the mower guard of FIGURE 4;

FIGURE 7 is a plan view of another portion of the mower guard of FIGURE 4; and

FIGURE 8 is a diagrammatic fragmentary view, partially in cross-section, illustrating the relationship among the front portion of the mower housing, the mower blade, and the tines of the mower guard of the present invention.

DESCRIPTION OF THE PREFERRED EMBODIMENTS

Figure 1:
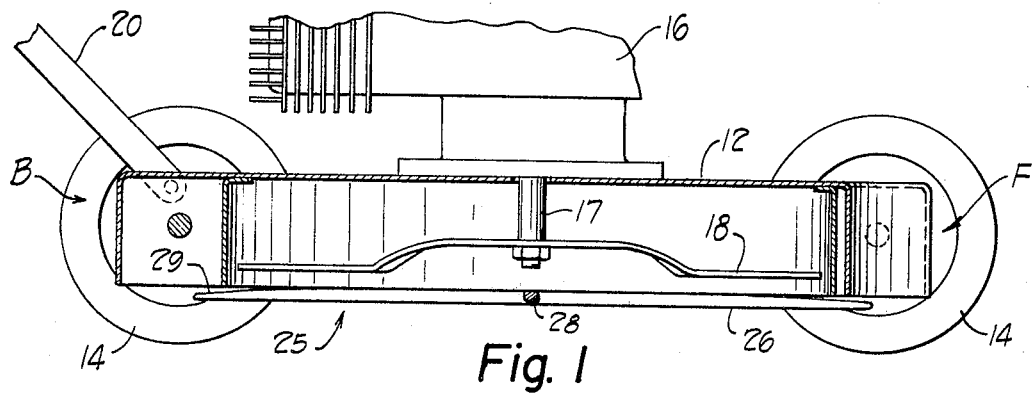
FIGURE 1 is a vertical cross-sectional view taken longitudinally through a rotary power mower provided with the new guard of this invention.
Figure 2:
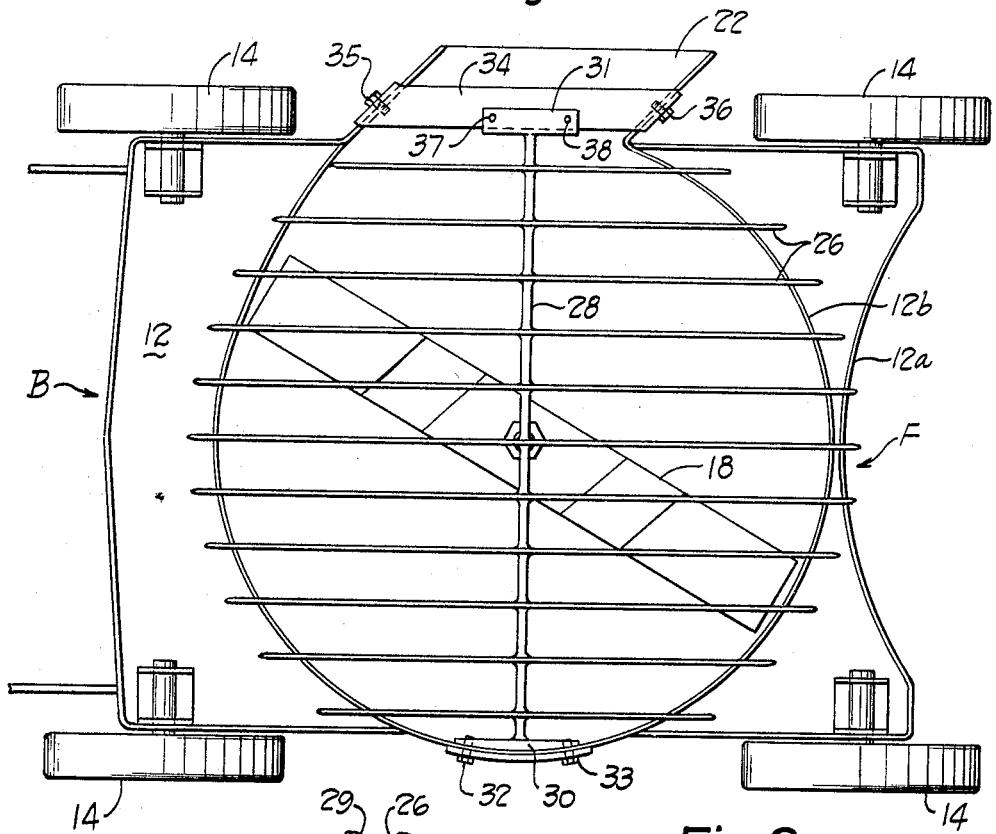
FIGURE 2 is a bottom plan view of the mower shown in FIGURE 1.

Referring to FIGURES 1 and 2, a rotary power lawn mower of conventional design is indicated generally by reference numeral 10. This particular lawn mower is shown by way of example only and the invention is equally applicable to rotary mowers of different construction. The mower 10 includes a housing 12 that is supported for movement by four wheels 14 that extend below the housing. A motor 16 is mounted on top of the housing 12 and a drive shaft 17 from the motor extends downward through the housing. A propeller-like cutting blade 18 is secured to the end of the drive shaft for rotation by the motor and is covered by the housing 12. A handle 20 extends from a back portion B of the housing 12 and facilitates moving the mower, normally in a direction toward a front end F of the housing. An opening 22 is formed in one side of the housing 12 to provide a passageway through which grass clippings are thrown as they are cut by the blade.

An improved guard 25 is secured beneath the housing 12 to act as a barrier and prevent foreign objects from contacting the blade. The construction and arrangement of the guard assures that the cutting action of the mower will in no way be hindered by the guard and in fact it is believed that the guard enhances the cutting action.

Figure 3:
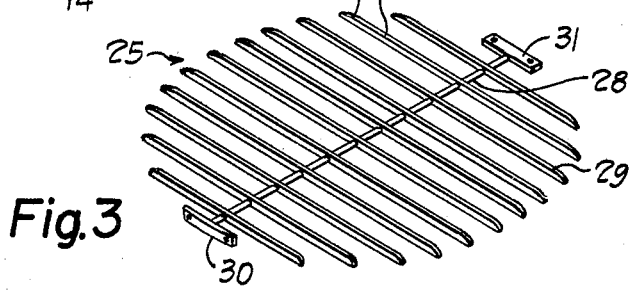
FIGURE 3 is a diagrammatic perspective view of the mower guard of FIGURES 1 and 2.

The guard 25 is formed of a plurality of straight tines 26 cantilevered from a transverse cross piece 28 that is secured to the housing 12 by brackets 30, 31 at each end. Preferably, the guard is a one piece forging or casting of steel and is tempered for strength. The tines 26 are essentially straight and parallel with each other. They are widely spaced along the cross piece 28, extend from the cross piece in opposite directions to a substantially equal extent, and all lie in a common plane. In the preferred construction, the tines are narrower in width than their height so as to be vertically rigid but laterally somewhat flexible. With this arrangement, the vertical relationship of the tines with the mower and the ground can be maintained while yet permitting some flexing of individual tines to one side or another to partially absorb the shock of foreign objects that might be struck. The tines 26 are pointed or tapered at opposite ends, with the taper being formed primarily by curved upper surface portions 29 at opposite ends of each tine. This construction is best shown in FIGURES 3 and 8. These pointed or tapered ends permit the tines 26 to move through the grass being cut without pushing the grass down. By providing the taper at the upper surface of the tines additional clearance between the tines and housing is provided while keeping the guard high off the ground.

The two brackets 30, 31 at opposite ends of the cross piece 28 secure the guard 25 to opposite sides of the housing 12 so that the tines 26 extend toward the front and back of the mower. Each of the brackets 30, 31 is elongated in the general direction in which the tines extend. The bracket 30 is attached to the upper side of the cross piece 28 and is secured at the lower edge of one side of the housing 12 by suitable means, such as screws 32, 33.

Due to the construction of the mower 10 shown, the bracket 31 is located at the opening 22 at one side of the housing 12. An auxiliary bracket 34 extends across the passageway 22 and is secured directly to the housing 12, as by screws, 35, 36. The bracket 31 is secured to the auxiliary bracket 34, as by screws 37, 38. With this arrangement the guard 25 is supported beneath the blade and housing, essentially parallel with the path through which the blade 18 rotates. The passageway 22 is unobstructed. The length of the brackets 30, 31 is sufficient to anchor the guard 25 at spaced locations that effectively prevent rotation of the guard about the axis of the cross piece 28. The particular arrangement by which the guard 25 is secured to the mower housing 12 will of course vary with the different constructions of lawn mowers, but certain relationships between the mower housing and the guard must be maintained, as will be explained below.

The guard 25 is located and maintained by the brackets 30, 31 in an important spaced relationship with the housing 12 so that there is no hindering of the cutting action of the mower by the guard. A preferred relationship is shown in FIGURES 1, 2 and 8. A concave front wall 12a and a convex blade encircling wall 12b of the housing 12 extend vertically above the ends of the tines 26 as shown diagrammatically in FIGURE 8. As will be better understood from FIGURE 2, the relationship of the wall 12b is the same with respect to all tines 26, whereas the wall 12a overlies only the central tines of the guard 25. The tines 26 extend beyond the wall 12b a distance only sufficient to assure adequate shielding of the blade. The walls 12a and 12b are spaced above underlying tines 26 a distance sufficient to establish a gap G between the housing and the upper surfaces 29 of the tines to provide a definite clearance and unobstructed entry of grass into the cutting path of the blade 18.

Because the tines 26 are cantilevered from a central location with respect to the mower 10 and because they are spaced downwardly from the lower edges of the vertical walls 12a, 12b, the tines can slide through the grass rather than flattening the grass down as an upwardly curved runner or a rod connected to the front of the housing would do. A similar construction and arrangement is provided at the back end of the mower to facilitate cutting grass with reverse strokes of the mower, as is often necessary.

It has been found that optimum results are obtained with this invention by controlling certain dimensions and relationships in the manufacture and attachment of the guard 25. It has been found that wide tines cause the grass to be flattened down and therefore such tines tend to leave patterns in the grass. Tines ⅛ inch in width will avoid such objectionable results. Similarly, the tines must not be too closely spaced, or they will tend to block grass that may be matted. By providing spaces 1½ inches wide between adjacent tines (i.e., placing ⅛ inch tines on 1⅝ inch centers) this problem is avoided. In establishing the gap G, a spacing of ⅛ inch from the upper surface of each tine to the lower surface of the wall 12b is sufficient to allow the tines to slide through the grass without pushing the grass down; yet the tines will adequately prevent foreign objects from reaching the blade. The close spacing of the tines to the housing also facilitates cutting the lawn relatively short where that is desired because the housing can be lowered a substantial distance before the guard rests on the ground.

A second embodiment of this invention is shown in FIGURES 4 to 7 of the drawings. An assembled guard 45, shown in FIGURE 4, functions in the same manner as the guard 25 already described, but is constructed differently. Separate tines 46 are supported in elongated grooves 47 formed in a support plate 48. The tines 46 are of the same shape as the tines 26, except for a projection 50 extending from the upper side at the center of each tine. A cover plate 52 having apertures 53 fits over the tines 46 and over the support plate 48. The projections 50 of each tine extend through one of the apertures 53, which are spaced the width of each groove 47 in the support plate. The cover plate 52 is secured to the support plate 48 by suitable means, such as by spot welds 55.

As shown in FIGURE 4, the support plate 48 is elongated transversely of the direction in which the tines 46 extend. Support brackets 56, 57 at opposite ends secure the guard assembly 45 to a mower housing, such as the housing 12 of the mower 10 of FIGURE 1. In this embodiment, the bracket 57 has been made of a single piece, rather than utilizing an auxiliary bracket, as in the first embodiment. The bracket 57 is constructed to extend across the opening 22 of the housing 12 in the same manner as the auxiliary bracket 34 of the first embodiment. The bracket 56 is secured to the opposite side of the housing 12 in a manner similar to that described in connection with the bracket 30 of the first embodiment.

Both the support plate 48 and the cover plate 52 have been formed with an enlarged central area 48a, 52a, respectively. These enlarged areas provide greater support for the longer tines 46 that span the central area of the circular path through which the blade 18 moves. By using fasteners such as screws to secure the support plate 48 and cover plate 52 instead of spot welds, tines which may become broken or bent can be replaced individually.

In operation, the mower 10 with the guard 25 attached is moved in a forward direction across grass to be cut. The motor 16 rotates the blade 18 at a high speed to cut the grass beneath the mower. As the mower moves forward the tines 26 pass through the grass, blocking access of foreign objects to the rotating blade and tending to set up and align the grass for cutting. There is no tendency of the guard to force the grass down because the ends of the tines are unconnected and do not curve upward or contact the mower housing. In wet grass the tines are particularly effective in overcoming the tendency of the grass to mat beneath the blade. In the event a wheel of the mower drops into a depression in the lawn, the guard 25 contacts the ground and holds the rotating blade far enough above the ground to prevent its digging into the lawn.

While preferred embodiments of this invention have been described in detail, it will be appreciated that various modifications or alterations may be made therein without departing from spirit or scope of the invention, as set forth in the appended claims.

What is claimed is:

1. A guard for a rotary lawn mower which comprises a supporting cross-piece constructed to extend across a mower blade housing beneath the mower blade, said cross-piece including a supporting piece having grooves and a cover plate and means securing said cover plate to said supporting piece, means on said cross-piece for securing said cross-piece to a mower housing, and a plurality of cantilever tines carried by and extending in two opposite directions from said cross-piece, said tines being constructed to extend beneath the rotational path of the mower blade of the housing to which said guard is attached, and said tines being separate pieces that fit into said grooves and are held in place by said cover plate.

2. A guard for a rotary mower of the type including a housing which is open at its bottom and a blade having cutting portions at each end rotatable in a circular cutting path, said guard comprising a cross-piece adapted to extend across the mower housing beneath the blade in a location bridging the circular path of the blade cutting portions and to be attached to the sides of the housing, a plurality of tines attached to said cross-piece and providing parallel, cantilevered portions extending in opposite directions from said cross-piece so that said cantilevered tine portions will be below the circular path of the blade cutting portions when said guard is attached to the mower housing, said cantilevered tine portions being spaced from each other along said cross-piece from one end thereof to the other and being free of support except for attachment to said cross-piece, thereby to provide unobstructed spaces between said tines through which grass can come into contact with the blade cutting portions when the mower is moved in both forward and rearward directions.

3. A guard as claimed in claim 2 wherein the free ends of said cantilevered tine portions terminate in a generally circular path spanned by said cross-piece.

4. A guard as claimed in claim 3 wherein the free ends of said cantilevered tine portions are pointed predominately by downwardly inclined upper surfaces.

5. A mower guard as set forth in claim 3 wherein the tines are approximately one-eighth inch wide and are spaced from each other a distance of one and one-half inch.

6. A mower guard as set forth in claim 2 wherein the tines are pointed predominantly by a downwardly inclined upper surface.

7. A mower guard as set forth in claim 6 wherein the tines are narrower than their height so as to be more flexible laterally than vertically when oriented horizontally beneath a rotary lawn mower.

8. In a rotary lawn mower including a wheel-supported housing and a blade having cutting portions at each end rotatable in a circular cutting path, said housing being rotatable in a circular cutting path, said housing being open at its bottom around the perimeter of said cutting path, the improvement comprising a guard below said blade, said guard including a cross-piece spanning said cutting path and attached to the sides of said housing, a plurality of tines attached to said cross-piece and providing cantilevered portions extending in opposite directions from said cross-piece toward the front and back of said housing below the circular path of said blade-cutting portions, said cantilevered tine portions being spaced from each other along said cross-piece from one end thereof to the other and being free of support except for attachment to said cross-piece, thereby to provide unobstructed spaces between said tines through which grass can come into contact with the blade-cutting portions when the mower is moved in both forward and rearward directions, and said cantilevered tine portions having their free ends terminating in a circular path and being pointed by downwardly inclined upper surfaces.

9. A rotary mower as claimed in claim 8 wherein said housing includes a wall extending below said blade at least partially around said cutting path, wherein the free ends of said cantilevered tine portions are spaced below said wall a distance of approximately ⅛ inch.

10. A mower as set forth in claim 8 wherein the tines are parallel to each other and each tine is narrower than its height so as to be more flexible laterally of the mower than vertically.

11. A mower as set forth in claim 8 wherein the tines are parallel and spaced from each other a distance of one and one-half inch.

12. A mower as set forth in claim 8 wherein the guard is formed of a single metal piece.

References Cited

UNITED STATES PATENTS

| | | | |
|---|---|---|---|
| 2,485,729 | 10/1949 | Gentry | 56—25.4 |
| 2,701,942 | 2/1955 | Caldwell, et al. | |
| 2,934,882 | 5/1960 | Kaut | 56—255 |
| 3,011,299 | 12/1961 | Classon | 56—255 X |
| 3,312,049 | 4/1967 | Walker | 56—255 |

ROBERT E. PULFREY, Primary Examiner

JAMES W. PETERSON, Assistant Examiner

U.S. Cl. X.R.

56—25.4